United States Patent
Karppanen et al.

(10) Patent No.: US 12,373,385 B1
(45) Date of Patent: Jul. 29, 2025

(54) DYNAMIC FORMAT CONVERSION FOR SHARED FILES

(71) Applicant: Amazon Technologies, Inc., Seattle, WA (US)

(72) Inventors: Jari Karppanen, Bellevue, WA (US); David Chukwuemeka Chukwuma, Clinton, PA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 18/189,052

(22) Filed: Mar. 23, 2023

(51) Int. Cl.
*G06Q 10/00* (2023.01)
*G06F 16/11* (2019.01)
*G06F 16/182* (2019.01)

(52) U.S. Cl.
CPC ........ *G06F 16/116* (2019.01); *G06F 16/1827* (2019.01)

(58) Field of Classification Search
None
See application file for complete search history.

(56) References Cited

U.S. PATENT DOCUMENTS 10,225,584 B2 * 3/2019 Liwerant ............ H04N 21/8456
2017/0132568 A1 * 5/2017 Glunz ..................... H04L 67/10

* cited by examiner

Primary Examiner — Tuankhanh D Phan
(74) Attorney, Agent, or Firm — Knobbe, Martens, Olson & Bear, LLP (57) ABSTRACT

Systems and methods are provided for dynamic format conversion of shared files. Computing devices can use different formats to store the same or substantially similar information. This difference in format can cause incompatibilities between such devices when these devices attempt to share files. The present disclosure can address this problem by providing for dynamic format conversion of shared files. Different computing devices may share access to a file directory storing base content, with each device being provided with a different view of the file directory such that base content in the directory appears in a format supported by the respective device. Further, input/output operations to files in the directory can be converted between respective formats, such that each device manipulates base content in the directory in a supported format.

20 Claims, 5 Drawing Sheets

DYNAMIC FORMAT CONVERSION FOR SHARED FILES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

One example of a network-based service that may be implemented using networked computing devices is that of directory and file sharing. An entity may provide for a given directory to be synchronized between multiple computing devices, such that writes to files in that directory on one device are synchronized to other devices with access to the shared directory. Each device may present the directory as part of a local file system. Thus, it may not be apparent from the point of view of each device that any network data transfer has occurred. This model of a locally addressable shared directory of content beneficially provides for synchronization while still enabling interaction with that content in the same manner as other local content.

DETAILED DESCRIPTION

Generally described, aspects of the present disclosure relate to handling mismatches in supported formats of shared content between different computing systems. Different computing systems sometimes format similar content differently, according to for example their operating system or software installed on the system. For example, a first operating system may store pointers to a uniform resource locator (URL) in a first file format (e.g., as a ".lnk" or ".url" file) while another operating system may store a pointer to the same URL in a second file format (e.g., as a ".webloc" file). When devices using these different operating systems collaborate within a shared file space, this difference in format can cause incompatibilities. For example, a first computer may save a file in the .lnk format to the shared space, which a second computer is unable to open due to lack of support for that format, despite being able to properly handle the underlying content (e.g., the URL). Embodiments of the present disclosure provide a solution to this problem by providing for conversion of formats in shared folders. Specifically, a file sharing system in accordance with embodiments of this disclosure can be configured to accept files in a format of a submitting device and render the files in formats compatible with receiving devices. For example, when a receiving device lists the contents of a shared folder containing a given content, the file sharing system may list the content as being available in a format supported by the receiving device, regardless of the format in which the content was provided to the file sharing system. Moreover, when the content is read, the file sharing system can convert to a format that is supported by the receiving computing device. Therefore, embodiments of the present disclosure can avoid incompatibilities that might arise when given content is stored in different formats that are not mutually supported across different computing devices.

To enable conversion of content between supported formats, the file sharing system as disclosed herein can maintain a set of templates, each corresponding to a type of base content and identifying conversions of that based content into a variety of formats for that base content. For example, a template may correspond to "network shortcut" content (such as URLs) and include instructions for generating a variety of files representing that network shortcut content in a variety of formats (e.g., as a .lnk file, a .webloc file, etc.). Similarly, a template may correspond to "word processor document" format (e.g., text and associated formatting) and include instructions for generating various word-processor-document-formatted files representing that content (e.g., .doc, .docx, .pages, .odf, etc.). When content is written to a shared directory in a given format (e.g., one supported by a submitting computing device), software executing on a writing computing device can submit that content to the file sharing system, and the file sharing system can then utilize a corresponding template to convert the content into a base format (e.g., a neutral representation of the content). When other devices request to read the contents of the shared directory, the file sharing system can determine what formats are supported by a reading computing device, and utilize the template to present the base content to the reading computing device in a format supported by that device. Thus, these templates can enable on-the-fly conversion of formats, enabling multiple computing devices with support for different formats to collaborate on given base content without incompatibility.

Presentation of a shared directory on each computing device is illustratively enabled by execution of software on the computing device that is associated with the file sharing system. For example, each computing device may implement a file share client that is configured to synchronize input/output (I/O) operations to one or more shared directories, such as by directly intercepting I/O operations to a shared directory and transmitting those operations to the file sharing system or by synchronizing a local directory that represents the shared directory with the file sharing system. In some instances, the conversion noted above is performed by the file sharing system remotely from individual end user computing devices. For example, the file sharing system may accept I/O operations from each user computing device in a format of that computing device, and apply format conversion to such operations to enable different user computing devices to interact with the same base content in different formats. Additionally or alternatively, conversion of file content between different formats may also be performed by the file share client.

In some embodiments, each user computing device explicitly notifies the file sharing system of supported formats. For example, an end user may manually designate supported formats via input to an interface provided by the file sharing system (e.g., via the file share client, which illustratively represents software provided by the file sharing system, via a network interface of the file sharing system, etc.). Additionally or alternatively, the file sharing system may be configured to programmatically detect supported formats on each computing device. In one example, programmatic detection is based at least partly on detected software executing on a computing device. For example, the file sharing system may determine that a user computing device is executing a certain operation system (OS) or certain software known to support a given format, and thus determine that the computing device supports that format. Detection of software may be based for example on network communications obtained from the computing device (e.g., browser fingerprinting or the like) or on direct inspection of the computing device when permission for such inspection is granted by an end user (e.g., via execution of the file share client). In another example, programmatic detection is based at least partly on explicit indication for supported formats provided by a computing device. For example, an OS executing on the computing device may directly indicate (e.g., via a registry or the like) supported formats. Thus, the file sharing system can determine supported formats of a computing device to support conversion of based content into supported formats.

While embodiments are described herein with reference to conversion between an unsupported and a supported format, in some examples a file sharing system can provide for conversion between formats even when all such formats are supported. For example, two computing devices associated with a shared directory may support identical formats, but indicate a relative preference between these formats (e.g., a higher preference for one format over another). Illustratively, both computing devices may have installed software that supports multiple word processing document formats, but the software on a first computing device may provide a high level of support for a first format (e.g., representing a default format of the software) and a lower level of support for a second format (e.g., as a compatibility format for other software) while the software on a second computing device provides a high level for the second format and a lower level for the first format. As another illustration, the two devices may execute the same software, but end users of the devices may express a relative preference between the two formats. Embodiments of the present disclosure can therefore provide for conversion between these formats, such that each device is presented with a most-preferred format (e.g., according to a level of support, end user preference, etc.) for a given base content.

As will be appreciated by one of skill in the art in light of the present disclosure, the embodiments disclosed herein improve the ability of computing systems, such as file sharing systems, to share content between different computing devices in a variety of formats. Moreover, the presently disclosed embodiments address technical problems inherent within computing systems; specifically, the wide variety of formats available to store given base content and the incompatibilities of such formats across devices. These technical problems are addressed by the various technical solutions described herein, including a file sharing system enabling the programmatic conversion of a given base content in a shared directory into a variety of formats on different computing devices. Thus, the present disclosure represents an improvement on file sharing systems and computing systems in general.

The foregoing aspects and many of the attendant advantages of this disclosure will become more readily appreciated as the same become better understood by reference to the following description, when taken in conjunction with the accompanying drawings.

Figure 1:
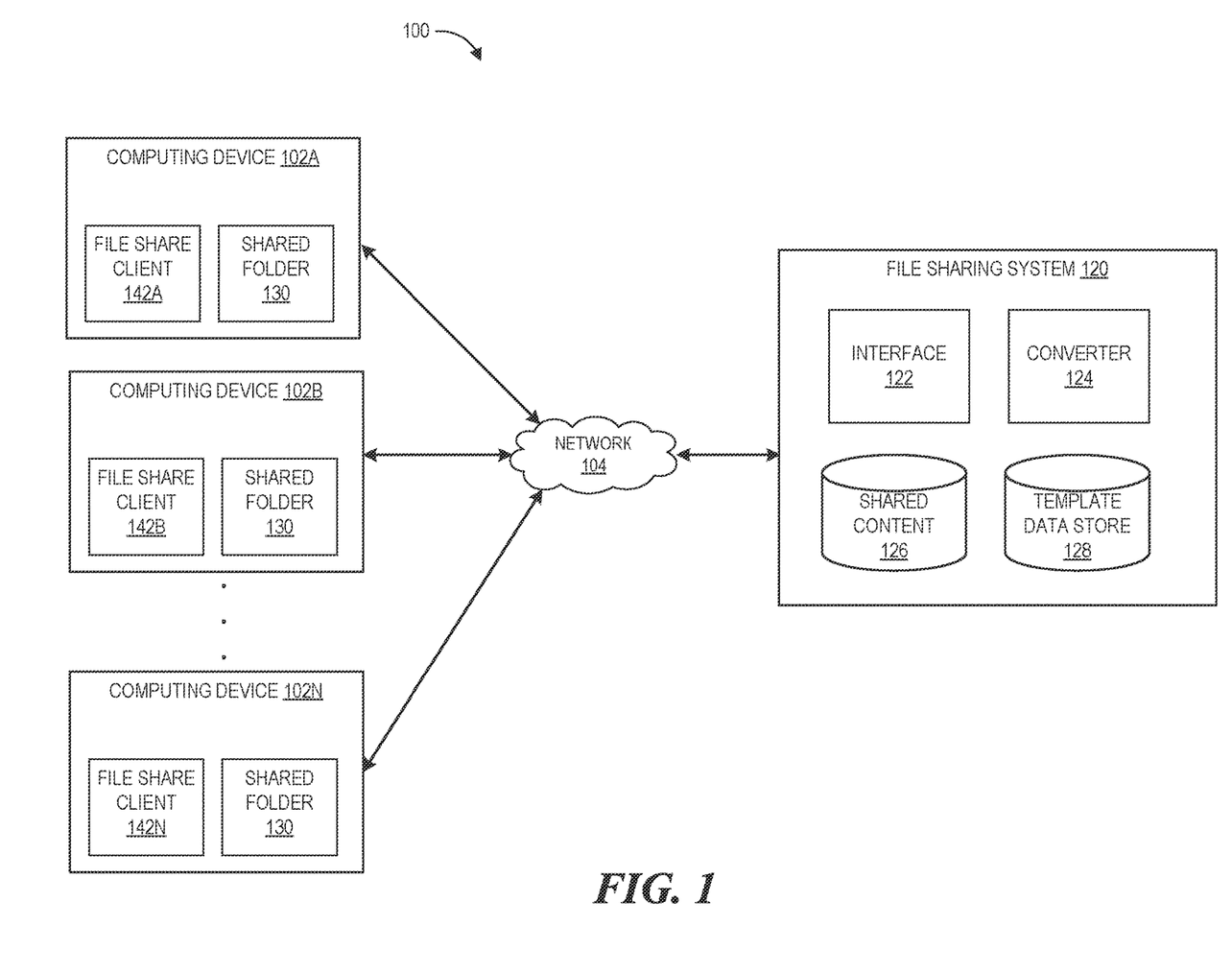
FIG. 1 depicts a schematic diagram of a file sharing system in which various embodiments according to the present disclosure can be implemented to provide a file sharing system enabling content to be shared to different computing devices with different file formats.

FIG. 1 depicts an example computing environment 100 including a file sharing system 120 in which embodiments of the present disclosure can be implemented to allow base content to be shared to different computing devices in different file formats. The file sharing system 120 is illustratively accessed by a set of computing devices 102, shown in FIG. 1 as computing devices 102A through 102N.

The computing devices 102 can include any network-equipped computing device, for example desktop computers, laptops, smartphones, tablets, e-readers, gaming consoles, and the like.

The file sharing system 120 can communicate with the user computing devices 102 over network 104. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

The file sharing system 120 provides to the computing devices 102 the ability to utilize a shared folder 130, such that I/O operations to the shared folder 130 are synchronized among the computing devices 102. In one embodiment, the shared folder 130 is presented to each computing device 102 as a directory in a local file system, such that the device 102 can interact with the shared folder using local I/O operations. In such an example, a local file system of each computing device may store a local representation (a copy) of the shared folder, with modifications to the local representation synchronized across devices 102 by a file share client 142B, discussed in more detail below. In another example, the shared folder 130 may be a logical representation of data stored remotely at the file sharing system 120, such that local I/O operations to the shared folder 130 are translated into corresponding network operations by the file share client 142B and such that no local representation of the shared folder 130 is in fact stored on the computing device. While embodiments are described herein that relate to presentation of a shared directory 130 as a directory in a local file system, other embodiments of the present disclosure may relate to interactions with non-local directories, such as shared folders 130 presented as network directories, shared folders accessed via a web browser, etc.

As noted above, interaction with or synchronization of the shared folder 130 can be achieved by use of a file share client 142 installed on each device 102 (e.g., file share client 142A on the computing device 102A, file share client 142B on the computing device 102B, and file share client 142C on the computing device 102C). In one embodiment, the file share client 142 synchronizes modifications to the shared folder 130 on each respective device 102, such as by detecting modifications (e.g., via I/O operations of each device 102) to a local representation of the shared folder 130 and submitting such modifications to the file sharing system 120 and by detecting modifications to shared content on the file sharing system 120 and synchronizing the modifications to the local representation of the shared folder 130. In another embodiment, the file share client 142 is executable to directly generate the shared folder 130 based on interaction with the file sharing system 120, such as by accepting I/O operations to the shared folder 130 and translating such operations to network operations submitted to the file sharing system 120.

To support the shared folders 130, the file sharing system 120 illustratively includes an interface 122 and shared content data store 126. The interface 122 illustratively accepts I/O operations related to the shared folder 130 from the file share clients 142, such as writes or reads of modifications to files stored in the shared folder 130. Content of the shared folder 130 can then be stored in the shared content data store 126, which illustratively corresponds to any persistent or substantially persistent data store. For example, each file written to the shared folder 130 by a device may be submitted to the file sharing system 120 via interaction of the file share client 142 and the interface 122 and stored in the shared content data store 126. When new content is stored in the shared content data store 126, file share clients 142 of other computing devices 102 can retrieve such content from the data store 126 via interaction with the interface 122 such that the content is presented in the shared folder 130 on those other devices 102. In one embodiment, the interface 122 is configured to notify file share clients 142 as to the presence of new content in the shared content data store 126. Additionally or alternatively, file share clients 142 may poll the interface 122 for changes to content in the shared content data store 126 (e.g., periodically, continuously, in response to a request to read from the shared folder 130, etc.).

As stated above, computing systems sometimes format similar content differently, according to for example their operating system or software installed on the system. When devices using these different formats collaborate within a shared file space, this difference in format can cause incompatibilities. To resolve these issues, the file sharing system 120 can support changing of formats between the computing devices 102 for shared content, such that each computing device can see the shared content in their locally supported format and modify the file content in their locally supported format, without running into incompatibility issues. Specifically, the file sharing system 120 includes a converter 124 configured to support conversion between different formats of base content, such that each computing device 102 can interact with given base content in a format preferred or supported by the computing device 102. As discussed above, conversion may occur on the basis of templates stored within the template data store 128, each of which corresponds to a particular type of base content. Each template can store instructions for converting that type of content (e.g., base content or base data) to various formats during conversion. As used herein, the terms "base data" and "base content" are intended to refer to the content of a file, as opposed to the format in which the content is stored. The templates stored within the template data store 128 data store may contain instructions of how to convert from base data to different formats (e.g., to ".xlsx", ".numbers", ".webloc", ".lnk", etc.) and vice versa. Moreover, the templates may store instructions from converting from one format to another (e.g., ".webloc" to ".lnk"). For example, the templates stored within the template data store 128 data store may contain programmatic code, that when executed, cause conversion of base content to a file format, or from one file format to another. Accordingly, rather than the shared folders 130 of each device 102 presenting the same view of the shared content 126, the converter 124 using the templates can tailor each device 102's view of the shared content 126 according to the formats supported or preferred by the device 102. For example, on obtaining from a computing device 102 a request to list directory contents of the shared folder 130, the file sharing system 120 may determine, for each item of content in the shared content 126, a format of that content supported or preferred by the device 102. The file sharing system 120 may then present each content to the device 102 in the preferred or supported format. Similarly, the converter 124 may format writes by a computing device 102 to shared content (e.g., to a representation of that shared content in a supported file format) to a representation of the written data in the base format before storage in the shared content data store 126, and may respond to requests to read content from a shared folder 130 in a given format by generating a file in that format from the base content as stored within the shared content data store 126. Accordingly, while the shared folder 130 can store the same content across devices 102, from the point of view of each computing device 102A, the shared folder 130 may contain a variety of files in formats supported by the computing device 102, which formats may vary across the computing devices 102.

As described above, in some embodiments, each computing device 102 can explicitly notify the file sharing system 120 of supported formats. For example, an end user may manually designate supported formats via input to an interface provided by the file sharing system (e.g., the file share client 142, which illustratively represents software provided by the file sharing system, via a network interface of the file sharing system, etc.). Additionally or alternatively, the file sharing system 120 may be configured to programmatically detect supported formats on each computing device. In one example, programmatic detection is based at least partly on detected software executing on a device 102. For example, the file sharing system 120 may determine that a user computing device 102 is executing a certain OS or certain software known to support a given format, and thus determine that the computing device supports that format. Detection of software may be based for example on network communications obtained from the computing device 102 (e.g., browser fingerprinting or the like) or on direct inspection of the computing device 102 when permission for such inspection is granted by an end user (e.g., via execution of the file share client 142). In another example, programmatic detection is based at least partly on explicit indication for supported formats provided by a computing device. For example, an OS executing on the computing device 102 may directly indicate (e.g., via a registry or the like) supported formats. Thus, the file sharing system 120 can determine supported formats of a computing device 102 to support conversion of based content into supported formats.

While embodiments are described herein with reference to conversion between an unsupported and a supported format, in some examples a file sharing system 120 can provide for conversion between formats even when all such formats are supported. For example, the computing devices 102 can communicate to the file sharing system 120 a preferential list of formats for each type of file. If one of the computing devices 102 can support multiple formats of spreadsheet extensions, the computing device can communicate to the file sharing system 120 such preferential list (e.g., for spreadsheet files, convert to .xls before .numbers).

Moreover, the file sharing system 120 can communicate with the converter 124, via the interface 122, to interpret a request from one of the computing devices 102 to view a listing of contents of a directory. For example, if one of the computing devices 102 requests to read the listing of contents of a directory associated with the shared folder 130, then the file sharing system 120 can utilize the converter 124 to interpret the request and convert from any listings to a format that is supported by the computing device. In performing this conversion, the converter 124 can utilize templates from the template data store 128 to convert any listings from a non-supported format to a supported format.

As stated herein, the example formats discussed above are non-limiting. Therefore, the converter 124 may convert base data to many types of formats in addition to the examples described above, and vice-versa. For example, the converter 124 may additionally convert from base data to different formats of presentation documents (e.g., .key, .odp, .ppt, .pptx, etc.). As another example, the converter 124 may additionally convert from base data to different formats of audio files (e.g., aif, .cda, .mid, .midi, .mp3, .mpa, .ogg, .wav, .wma, .wpl, etc.). As another example, the converter 124 may additionally convert from base data to different formats video files (e.g., .3g2, .3gp, .avi, .flv, .h264, .m4v, .mkv, .mov, .mp4, .mpg, .mpeg, .rm, .swf, .vob, .webm, .wmv, etc.). As another example, the converter 124 may additionally convert from base data to different formats image files (e.g., .ai, .gif, .ico, .jpeg, .jpg, .png, .ps, .psd, .svg, .tif, .tiff, .webp, etc.).

Additionally or as an alternative to conversion of file formats, the converter 124 may modify and/or alter base data to other content, according to user-defined rules. In some cases, a user-defined rule may describe a protocol conversion of a uniform resource identifier (URI) (e.g., a URL, a Uniform Resource Name (URN), etc.) in one protocol to a URI in another protocol. For example, a first device may store a base content including a URI specifying a first protocol or scheme that designates handling of remote content (e.g., "http://open/view?id=12345") in the shared folder 130. A user-defined rule may contain instructions of how to convert that base content (the URI) such that when it is used on a second device, the remote content can be handled according to a different scheme or protocol (e.g., as "application1://open/view?id=12345", such that the "http" scheme of the URI is replaced with "application1," which may designate a software application on the second device). As another example, a user-defined rule may convert other parts of URIs (e.g., a content path) or other parts of different types of base content. For example, a user-defined rule may include regular expressions that designate transformation of base content. Thus, the converter 124 disclosed herein can perform a wide variety of conversions to base content in addition or alternatively to converting formats.

As noted above, while converter 124 is depicted as implemented on the file sharing system 120, in some embodiments the converter 124 is additionally or alternatively implemented on each computing device (e.g., in conjunction with or as part of the file share client 142).

The file sharing system 120 is depicted in FIG. 1 as operating in a distributed computing environment including several computer systems that are interconnected using one or more computer networks (not shown in FIG. 1). The file sharing system 120 can also operate within a computing environment having a fewer or greater number of devices than are illustrated in FIG. 1. Thus, the depiction of the file sharing system 120 in FIG. 1 should be taken as illustrative and not limiting to the present disclosure. For example, the file sharing system 120 or various constituents thereof could implement various Web services components, hosted or "cloud" computing environments, and/or peer to peer network configurations to implement at least a portion of the processes described herein. Moreover, the environment 100 may include additional elements not shown in FIG. 1.

Further, the file sharing system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
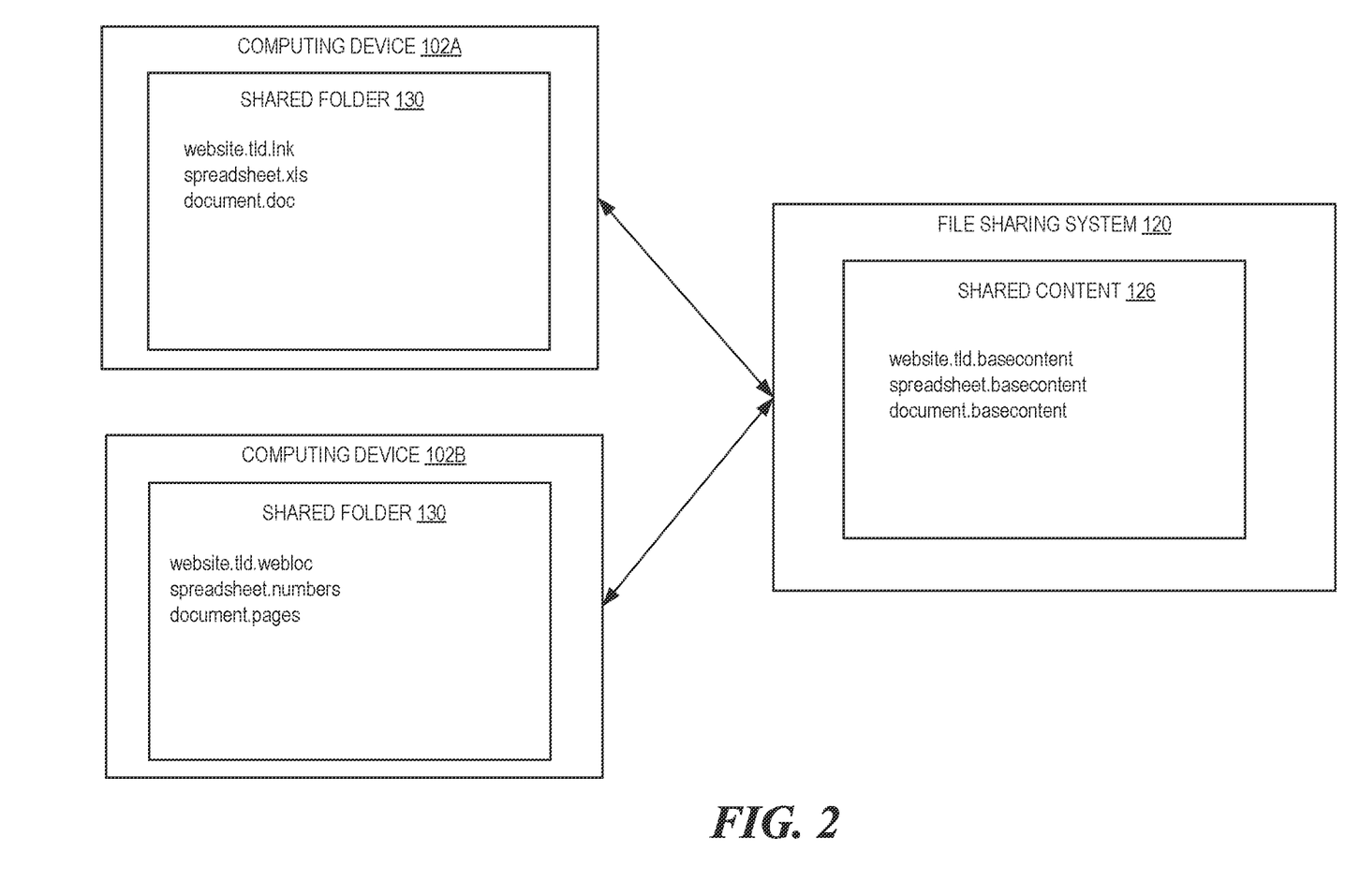
FIG. 2 is a visualization depicting how a given shared folder corresponding to a set of shared content on the file sharing system of FIG. 1 can be presented as different representations of the shared folder across different devices.

To further illustrate the concept of providing a shared folder 130 providing for sharing of base content in multiple formats, FIG. 2 depicts how a given shared folder 130 corresponding to a set of shared content 126 can be presented as different representations (or "views") of the shared folder 130 across different computing devices 102. In FIG. 2, it is presumed that a computing devices 102A and 102B each include software (such as an OS) executable to interact with different types of base content, such as URL shortcuts, sheets, and word processor documents. However, that software may support different formats for such content. Accordingly, while the share folder 130 in each device 102 of FIG. 2 includes the same base content (a URL shortcut, a spreadsheet, and a document), corresponding to the base content in the shared content data store 126, the representations of that base content different between the computing devices 102. Specifically, the computing device 102A depicts the URL shortcut in a first format (.lnk) while the computing device 102B depicts the URL shortcut in a second format (.webloc). Similar format differences exist between the spreadsheet and document files. Notably, this difference in format does not inhibit the sharing of content between the devices 102. That is, embodiment of the present disclosure can enable both devices 102 to interact with given base content in their supported or preferred formats, and for modifications to the base content to be synchronized between the devices 102. Illustratively, the converter 124 discussed above may be configured to present each base content in a format supported by a respective device 102, and to interpret modifications to respective formats into corresponding modifications of base content in the shared content data store 126. For example, on obtaining a request to list the contents of the shared folder 130, the converter 124 may determine a set of preferred or supported formats for each base content and present each base content in a supported or preferred format. Similarly, on obtaining a request to read a base content (e.g., as a request to read a file that represents the base content in a supported format), the converter 124 can generate a file representing the base content in the supported or preferred format. On obtaining a write to the base content (e.g., as a write to the file that represents the base content in a supported format), the converter 124 can convert the write (or the file subsequent to the write) into a corresponding change to the base content, and store the base content, as changed, in the shared content data store 126. Thus, while each device 102 is presented with a different view of the shared folder 130, they are provided with shared access to the content of the shared folder 130 and any incompatibilities that may occur due to a difference in supported formats between the devices 102 are removed.

Figure 3:
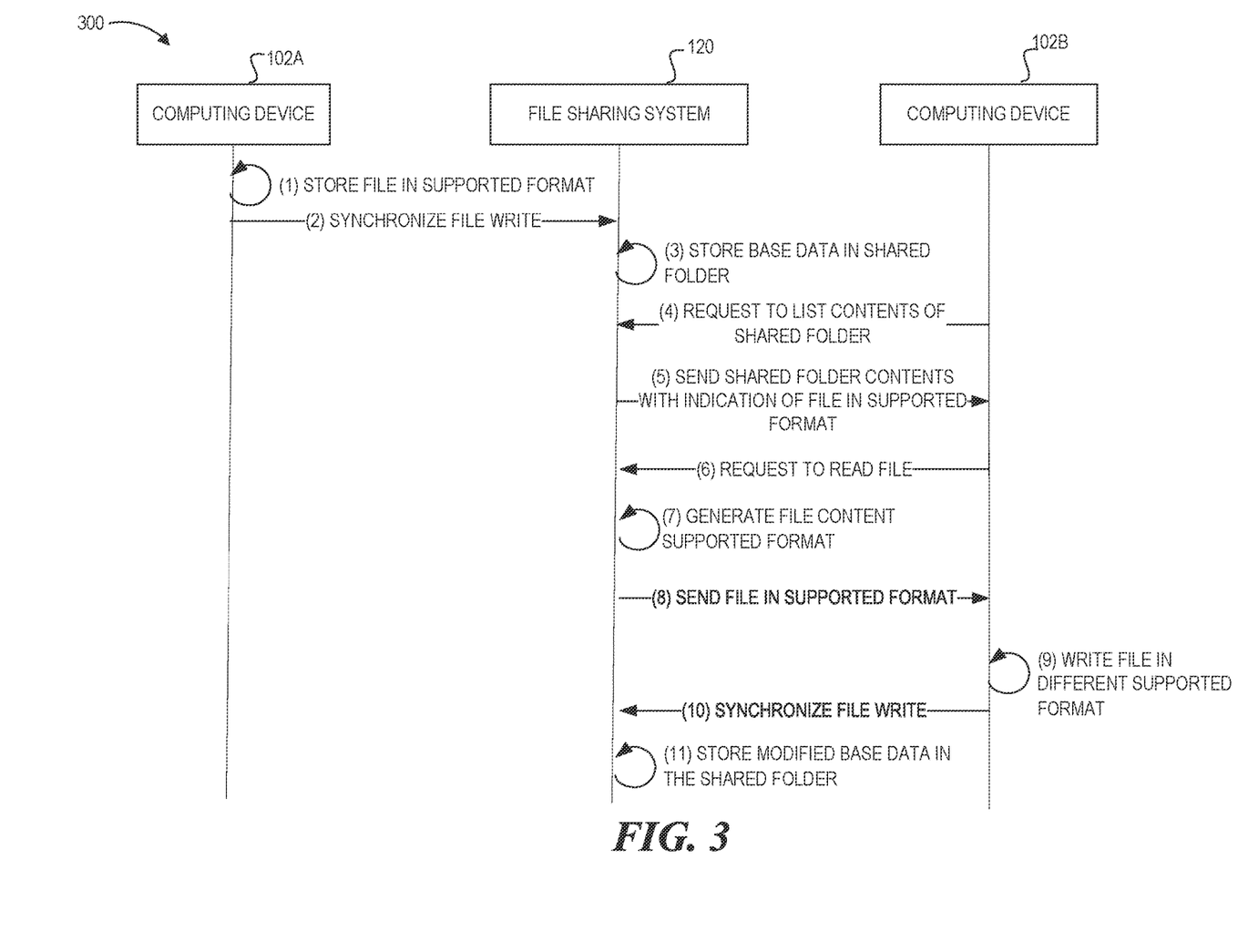
FIG. 3 depicts illustrative interactions between the file sharing system of FIG. 1 and computing devices for allowing the computing devices to store and modify shared content in their supported formats.

With reference to FIG. 3, illustrative interactions will be described between the file sharing system 120 and the computing devices 102 for allowing the computing devices 102 to store and modify shared content in their supported formats. The interactions of FIG. 3 may occur, for example, after each computing device has installed their version of a file share client 142 such that the shared folder 130 is already accessible to each computing device.

For the purposes of illustration, FIG. 3 presumes a configuration in which each device 102 maintains a local copy of a shared folder 130 that may be modified via local I/O operations, and in which changes to the shared folder 130 are then synchronized to the file sharing system 120. However, it should be appreciated that these interactions may be modified such that no local copy is required (e.g., such that local I/O operations are converted into network operations to the file sharing system 130, such that no storage of data is required on the computing device 102). Similarly, while FIG. 3 depicts conversion operations occurring on the file sharing system 120, conversion may additionally or alternatively occur on a client device 102 (e.g., via operation of the file share client 142).

The interactions begin at (1), where the computing device 102A stores a file in its copy of the shared folder 130 (e.g., a spreadsheet named "sales.xls"). The file is illustratively stored in a format that is supported by the computing device 102A.

At (2), the computing device 102A (e.g., via operation of the file share client 142) synchronizes the storing of the file with the file sharing system 120. The file sharing system 120 then, at (3), stores the file as base data. As described above, the file sharing system 120 may retrieve a template from the template data store 128 corresponding to a format of the stored file, which the template provides instruction of how to convert the file from the format it was initially stored in to base data for storage (e.g., from "sales.xls" to base data). In referencing the template, the file sharing system 120 may parse the file into data that can be stored as base data. For example, if the file is a spreadsheet, then the file sharing system 120 may parse the file to retrieve the file name (e.g., "Sales") and to extract the content elements of the spreadsheet (e.g., word processors, shortcuts, presentations, video, image, audio, etc.). The file sharing system 120 may then take the parsed data and store it as base data for a spreadsheet file (e.g., marked as being within the shared folder 130 and as a part of a list of content of a directory) in the shared content 126 data store. Alternatively, the file share client 142A may parse the file prior to sending the communication to the file sharing system 120.

While the present description of FIG. 3 presumes conversion from an initial format for purposes of storing base data, in some embodiments the file sharing system 120 may store a file in its initial format, and conversion may occur on reading that file by a device 102 that does not support the format. Additionally or alternatively, the file sharing system 120 may store the base content in a different format (such as one expected to be supported by a majority of devices 102 with access to a shared folder 130). Thus, discussion of storing base data should be understood to not preclude storage of the base data in a given format.

At (4), the file sharing system 120 receives a request to list contents of the shared folder 130 from the computing device 102B. In response, at (5), the file sharing system 120 sends a list of the contents of the shared folder 130 to the computing device 102B, with files corresponding to each base content shared folder 130 listed as in formats supported or preferred by the computing device 102. For example, the file sharing system 120 can determine for each base content in the shared folder 130 a format for the base content supported by the computing device 102B. The file sharing system 120 can then include the base content in a list of contents of the shared folder 130 by including in the list a file corresponding to the base content in the supported or preferred format. For example, the file sharing system 120 may identify that a spreadsheet document (e.g., named "spreadsheet") is included within the shared folder 130, and thus list as included in the shared folder 130 a file that represents the document in a format preferred or supported by the computing device 102B. Illustratively, where the computing device 102 uses a ".numbers" format for spreadsheets, the shared folder 130 can be listed as including a file "spreadsheet.numbers" (that is, the base content named "spreadsheet" in the format represented by the ".numbers" extension). Thus, from the point of view of the computing device 102B, the shared folder 130 includes the base content in a supported format, regardless of the format in which the content was stored to the shared folder 130 by the computing device 102A.

At (6), the computing device 102B (via the file share client 142B) sends to the file sharing system 120 a request to read the file (e.g., "spreadsheet.numbers") listed as included in the shared directory 130. The file sharing system 120 then, at (7), creates the file in the requested format. For example, the file sharing system 120 may retrieve a template from the template data store 128 where the template may provide instruction of how to convert the file from a format of the base data as stored in the shared content datastore 126 to a format that is compatible with the computing device 102B (e.g., the format as indicated by the extension of the file listed in the contents of the shared folder 130 as provided to the computing device 102B). In referencing the template, the file sharing system 120 may retrieve the base data associated with the requested file from the shared content data store 126 and create the file by converting the base data into the format compatible with the computing device 102B. For example, if the request is for a word processor document, then the file sharing system 120 may retrieve the base data (numbers, characters, words, paragraphs, formatting functions, etc.) associated with that word processor from the shared content data store 126 and utilize a template retrieved from the template data store 128 to create a word processor document that is compatible with the format of the computing device 102B (e.g., a ".pages" file) with that base data. Creation may occur by operation of the converter 124. The file sharing system 120 then sends the generated file to the computing device 102B, at (8). Therefore, the file created by the file sharing system 120 is able to be opened and modified by the computing device 102B, such that the computing device 102B is presented with the base content written to the shared folder 130 by the computing device 102A, despite the base content being written in a different format potentially unsupported by the computing device 102B.

Additionally or alternatively, while the interactions of FIG. 3 discuss converting base data to a file format (or a file format to base data) all at one time, the converter 124 may perform a partial conversion of base data to a file format (or a partial conversion of a file format to base data). For example, the converter 124 may identify that base data to be converted to a file format (e.g., convert base video data to a .mpg format) is of a certain size (e.g., the size of the base data is considered large), and therefore, the converter 124 may choose to retrieve, some, but not all, the base data (as partial data) to convert (e.g., due to memory limitations, processing limitations, file size restrictions, etc.). The converter 124 may convert this partial data locally on the file sharing system 120 prior to sending the partial converted data to the computing devices 102. Therefore, the converter 124 may perform multiple partial conversions until all the base data (e.g., all the video base data to be converted to a .mpg file) has been converted at least due to the size of the base data. In some instances, conversion may be based on a part of a file being read. For example, the converter 124 may support a "convert-on-read" functionality that accepts a request to read a portion of a file being read (e.g., by bit range) and generates and provides that portion of the file from base content via conversion responsive to the read request.

While FIG. 3 depicts generation of file content in a supported format subsequent to a request to read the file, such generation may occur at other times (e.g., immediately after storage of a file by the computing device 102A, after a request to read the contents of the shared folder 130, etc.).

Notably, the interactions of FIG. 3 can provide for bi-directional (or multi-directional, in the case of three or more devices 102) editing or modification to base content in a shared folder 130. For example, once read, the computing device 102B can write to the base content by writing to the file presented on the computing device 102B, as shown at interaction (9). This write is then synchronized to the file sharing system 120 at (10), and stored in the shared folder by the file sharing system 120 at (11). Interactions (9) through (11) may be similar to interactions (1) through (3). For example, interaction (11) can include converting the file or a portion thereof written by the computing device 102B into base content stored at the file sharing system 120, such that the base content can then be retrieved and modified by the computing device 102 in a format supported or preferred by the computing device 102. Thus, the interactions of FIG. 3 provide for different computing devices 102 supporting different formats to view, read, and write to a shared folder 130.

Figure 4:
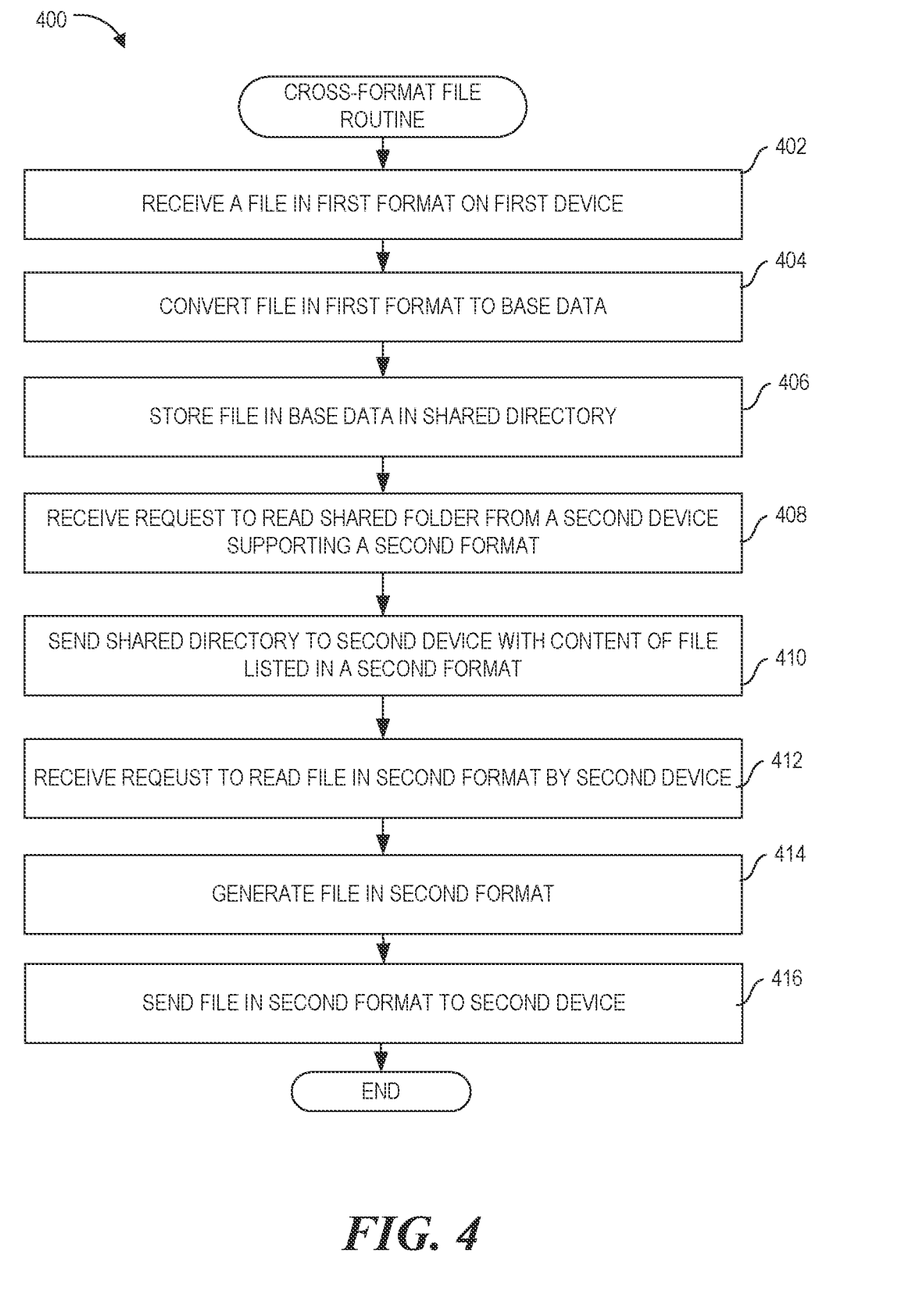
FIG. 4 depicts an illustrative routine that can be implemented on the file sharing system of FIG. 1 to allow sharing and modification of a shared file in multiple formats.

With reference to FIG. 4, an illustrative routine 400 will be described for the file sharing system to allow sharing and modification base content across multiple distinct formats. The routine 400 may be implemented, for example, by the file sharing system 120 of FIG. 1. Additionally or alternatively, the routine 400 may be implemented on a user computing device 102. As described below, the routine 400 illustratively enables two or more user computing devices 102 to exchange content while presenting that content in different formats among the user computing devices 102, according to for example compatibility of such formats on each device 102.

The routine 400 begins at block 402, where the file sharing system 120 receives a file from a first computing device 102 with a first format for storage in a shared folder 130. For example, the file may be a URL shortcut generated at the first computing device 102 and written to the shared folder 130 as viewed at the first computing device 102. The file may illustratively be submitted to the file sharing system 120 by a file share client 142 executing on the first computing device 102.

At block 404, the file sharing system 120 utilizes the converter 124 to convert the received file into base data (e.g., in an intermediary format specific to base data). As described herein, the file sharing system 120 may illustratively retrieve a template from the template data store 128 that corresponds to the received file. The converter 124 may use the template from the template data store 128 to parse data from received file such that the resulting parsed data can be stored as base data in the shared content 126 (e.g., parsing a word processing document to parse out the characters, words, ordering of paragraphs, fonts used, formatting specifics, etc.). As described above, base data in this manner can be converted to any format for access by any computing device when requested for viewing and/or reading by any of the user computing devices 102. At block 406, the file sharing system 120 stores the base data in the shared content 126 data store. While the routine 400 depicts conversion prior to storage, in some instances such conversion can be omitted. For example, the file sharing system 120 may store a file as written by the first computing device 102 (thus storing the base data represented by the file), and conversion may occur on reading of the file by another computing device 102 that supports or prefers a different format.

At block 408, the file sharing system 120 receives a request from a second device 102 to read a list of contents of the shared folder 130. The second computing device 102 illustratively supports or prefers a different format for the based data than the first format. For example, the base content may be a URL shortcut and may have been provided in a .lnk file format, while the second device 102 supports URL shortcuts in the .webloc format and lacks support for the .lnk file format. Accordingly, at block 410, the file sharing system 120 sends to the second device 102 a list of contents of the shared folder that includes a representation of the base content of the first file in a second format supported or preferred by the second device. Extending the example above, the file sharing system 120 may determine that the second device 102 supports or prefers the .webloc format, and thus presents the shared folder 130 as including a file in the .webloc format. The file presented to the second device 102 may illustratively share a name with the file obtained from the first device 102, but differ in extension to reflect the difference in format. Accordingly, it may appear to both devices 102 that the shared folder 130 includes the "same file," when in fact the folder 130 includes shared base content that is represented to each device 102 according to a file format supported by that device 102.

The routine 400 then continues to block 412, where the file sharing system 120 receives a request from the second computing device to read the file in the second format. Accordingly, at block 414, file sharing system 120 generates the file in the second format compatible with the second device 102. As described herein, the system 120 may utilize a template corresponding to the base data stored in the shared directory to generate, from the base data (or a given representation of the base data) the file in the second format. Extending the example above, the file sharing system 120 may determine that the second device 102 supports or prefers the .webloc format, and thus present the URL shortcut of the first file, as written by the first computing device 102, in a .webloc formatted file. The file sharing system 120 then sends the file in the second format of the second device 102.

While FIG. 4 depicts conversion to a second file format as occurring in response to a request to read the file, such conversion may occur at other times, such as responsive to a listing of the contents of the shared directory 130, responsive to submission of a file in a first content, etc. Thus, description of the routine 400 is intended to be illustrative.

Figure 5:
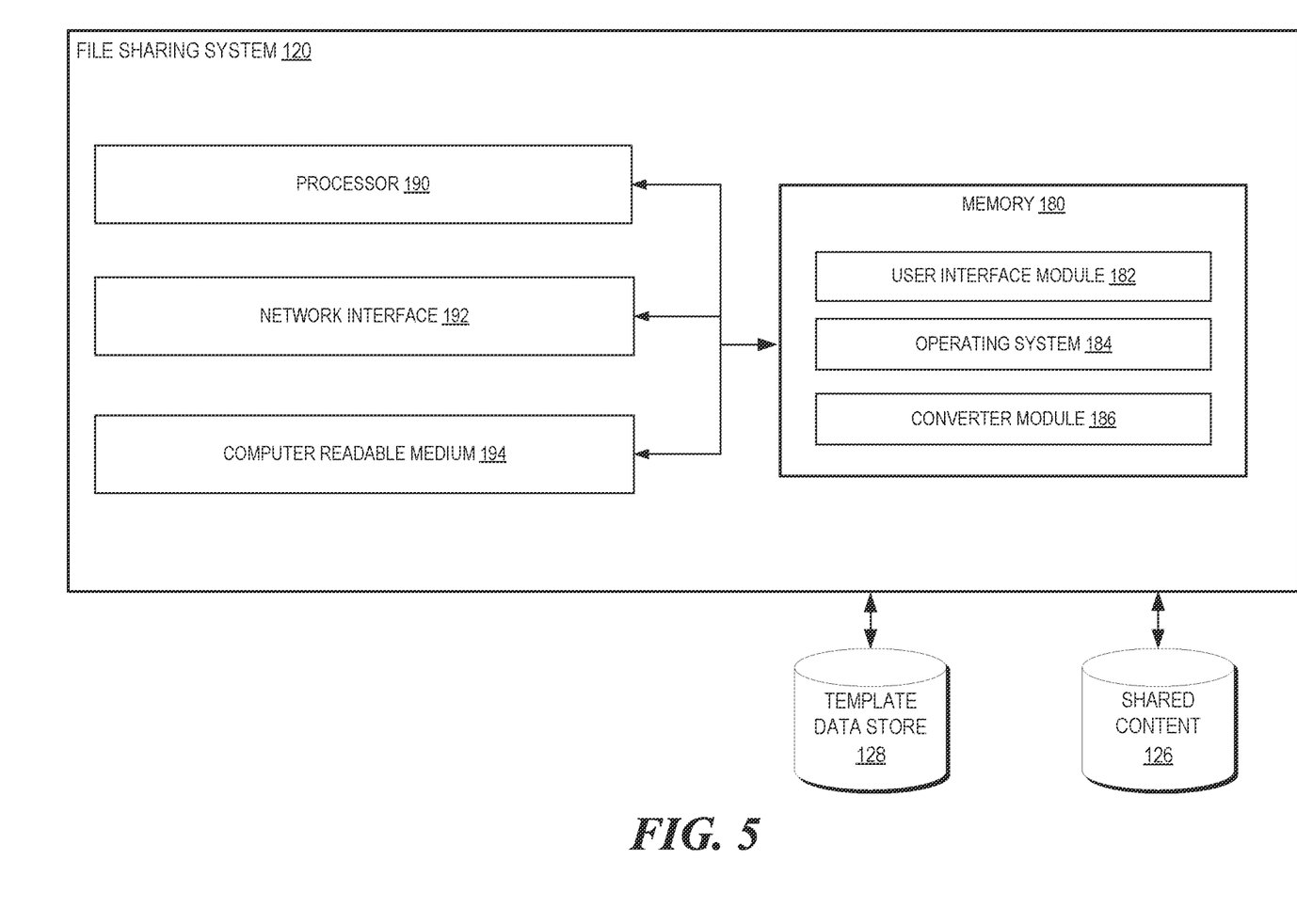
FIG. 5 depicts a general architecture of a computing system that can be used to perform one or more of the techniques described herein or illustrated in FIGS. 1-4.

FIG. 5 depicts an example architecture of a computing system (referred to as a file sharing system 120) that can be used to perform one or more of the techniques described herein or illustrated in FIGS. 1-4. The general architecture of the file sharing system 120 depicted in FIG. 5 includes an arrangement of computer hardware and software modules that may be used to implement one or more aspects of the present disclosure. The file sharing system 120 may include many more (or fewer) elements than those shown in FIG. 5. It is not necessary, however, that all of these elements be shown in order to provide an enabling disclosure. As illustrated, the file sharing system 120 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of file sharing system 120. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include converter module 186. In one embodiment, the converter module 186 when executed, can implement various aspects of the present disclosure. For example, the converter module 186 may implement functionality of the converter 124 as described herein, e.g., converting base content stored in a shared content data store 126 (representing content of a shared folder 130) between various formats, such as by use of templates in a template data store 128. The converter module 186 may thus implement aspects discussed herein or illustrated in FIGS. 1-4.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A network-based file sharing system for providing dynamic format conversion for shared files and avoiding format incompatibilities between computing devices supporting distinct formats for shared content, the system comprising:
 a data store storing templates, each template corresponding to a type of base content and information enabling the base content to be converted into multiple file formats; and
 a processor configured to:
  obtain, from a first computing device, a write to a first file of a first format, wherein the first file corresponds to a first type of base content, and wherein the first file is stored in a directory shared between the first computing device and a second computing device, the second computing device lacking support for the first format;
  identify a template of the templates that corresponds to the first type of base content;
  using the template, convert the first file to base content representing contents of the first file;
  provide to the second computing device, a listing of contents of the directory, the listing of the contents of the directory identifying the base content as a second file in a second format compatible with the second computing device;
  obtain, from the second computing device, a request to read the second file;
  convert, using the template, the base content into the second file of the second format, the second file representing, in the second format, the contents of the first file in the first format as written by the first computing device; and
  provide, to the second computing device, the second file.

2. The file sharing system of claim 1, wherein the base content includes a uniform resource locator (URL), the first format corresponds to a Ink extension file, and the second format corresponds to webloc extension file.

3. The file sharing system of claim 1, wherein the processor is further configured to obtain an indication from the first computing device that the first computing device supports the first format and an indication from the second computing device that the second computing device supports the second format.

4. The file sharing system of claim 3, wherein each indication is an indication of an operating system executing on the respective computing device.

5. A method comprising:
 obtaining, from a first computing device, base content corresponding to a first file in a first format, wherein the first file corresponds to a first type of base content, and wherein the first file is stored in a directory shared between the first computing device and a second computing device, the second computing device lacking support for the first file;
 providing, to the second computing device, a listing of contents of the directory, the listing of the contents of the directory identifying the base content as a second file in a second format compatible with the second computing device, wherein the listing of contents of the directory provided to the second computing device indicates that the second file is stored in the directory in a format different than a format in which the base content is stored in the directory;
 obtaining, from the second computing device, a request to read the second file;
 converting the base content into the second file of the second format, the second file representing, in the second format, the contents of the first file in the first format as written by the first computing device; and
 providing, to the second computing device, the second file.

6. The method of claim 5, wherein the method is implemented by a file sharing system remote from the first and second computing devices.

7. The method of claim 5, wherein method is implemented by a file share client executing on the second computing device.

8. The method of claim 5 further comprising identifying that the second format is supported by the second computing device.

9. The method of claim 5, wherein converting the base content into the second file of the second format comprises conversion of the base content into the second file using a template designating a conversion of the type of base content into the second format.

10. The method of claim 5 further comprising:
obtaining, from the second computing device, a request to list the contents of the directory; and
generating, for the second computing device, a listing of contents of the directory, the listing of contents including an identifier of the second file in the second format.

11. The method of claim 5, wherein the first computing device implements a first operating system and the second computing device implements a second operating system.

12. The method of claim 5, wherein the first computing device implements a first software application supporting the first format and the second computing device implements a second software application supporting the second format.

13. The method of claim 5 further comprising:
obtaining a modification of the second file by the second computing device representing modified base content;
obtaining, from the first computing device, a request to read the base content from the directory;
convert the modified base content into a third file of the first format; and
provide, to the first computing device, the third file.

14. One or more non-transitory computer-readable media comprising instructions executable by a computing system, and wherein the instructions, when executed, cause the computing system to:
obtain, from a first computing device, base content corresponding to a first file in a first format, wherein the first file corresponds to a first type of base content, and wherein the first file is stored in a directory shared between the first computing device and a second computing device;
provide, to the second computing device, a listing of contents of the directory, the listing of the contents of the directory identifying the base content as a second file in a second format compatible with the second computing device, wherein the listing of contents of the directory provided to the second computing device indicates that the second file is stored in the directory in a format different than a format in which the base content is stored in the directory;
obtain, from the second computing device, a request to read the base content from the directory;
convert the base content into a second file of a second format, the second file representing, in the second format, the contents of the first file in the first format as written by the first computing device; and
provide, to the second computing device, the second file.

15. The one or more non-transitory computer-readable media of claim 14, wherein the second computing device lacks support for files of the first format.

16. The one or more non-transitory computer-readable media of claim 14, wherein the instructions, when executed, further cause the computing system to determine that the second computing device is associated with a higher preference for the second format than the first format.

17. The one or more non-transitory computer-readable media of claim 16, wherein the instructions cause the computing system to determine that the second computing device is associated with a higher preference for the second format than the first format based at least in part on at least one of software executing on the second computing device or an indication obtained by an end user of the second computing device.

18. The one or more non-transitory computer-readable media of claim 14, wherein the instructions, when executed, further cause the computing system to:
obtain, from the second computing device, a request to list the contents of the directory; and
generate, for the second computing device, a listing of contents of the shared directory, the listing of contents including an identifier of the second file in the second format.

19. The one or more non-transitory computer-readable media of claim 14, wherein the instructions, when executed, further cause the computing system to:
extract the base content from the first file; and
store the extracted base content;
wherein conversion of the base content into the second file of the second format is based on the extracted base content.

20. The one or more non-transitory computer-readable media of claim 14, wherein conversion of the base content into the second file of the second format is based on conversion of the first file into the second file.

* * * * *

UNITED STATES PATENT AND TRADEMARK OFFICE
CERTIFICATE OF CORRECTION

PATENT NO. : 12,373,385 B1
APPLICATION NO. : 18/189052
DATED : July 29, 2025
INVENTOR(S) : Jari Karppanen Page 1 of 1

It is certified that error appears in the above-identified patent and that said Letters Patent is hereby corrected as shown below:

In the Claims

Column 16, Claim 2, Line 29, delete "a Ink extension" and insert -- a lnk extension --.

Signed and Sealed this
Sixteenth Day of September, 2025

Coke Morgan Stewart
*Acting Director of the United States Patent and Trademark Office*